United States Patent
Gerhardt

(10) Patent No.: US 10,029,522 B1
(45) Date of Patent: Jul. 24, 2018

(54) VERTICAL HITCH PIN

(71) Applicant: Evan Gerhardt, Alden, NY (US)

(72) Inventor: Evan Gerhardt, Alden, NY (US)

( * ) Notice: Subject to any disclaimer, the term of this patent is extended or adjusted under 35 U.S.C. 154(b) by 27 days.

(21) Appl. No.: 15/232,951

(22) Filed: Aug. 10, 2016

Related U.S. Application Data

(60) Provisional application No. 62/203,465, filed on Aug. 11, 2015.

(51) Int. Cl.
B60D 1/02 (2006.01)

(52) U.S. Cl.
CPC .................................. B60D 1/025 (2013.01)

(58) Field of Classification Search
CPC ........ B60D 1/025; B60D 1/02; F16B 13/0808
See application file for complete search history.

(56) References Cited

U.S. PATENT DOCUMENTS

| | | | | |
|---|---|---|---|---|
| 61,399 A * | 1/1867 | Coates | ................ | F16B 13/0808 411/344 |
| 198,937 A * | 1/1878 | Gott | .................... | F16B 13/0808 411/344 |
| 401,659 A * | 4/1889 | Remington | ......... | F16B 13/0808 294/89 |
| 775,200 A * | 11/1904 | Webber | ............... | F16B 13/0808 403/379.2 |
| 1,516,347 A * | 11/1924 | Pataky | ................ | F16B 13/0808 411/340 |
| 1,974,966 A * | 9/1934 | McClure | .................. | B60D 1/02 280/515 |
| 2,161,390 A * | 6/1939 | Schmalstieg | ............ | B61G 7/00 213/188 |
| 2,224,522 A * | 12/1940 | Peterson | .................. | B60D 1/02 278/96 |
| 2,377,086 A * | 5/1945 | Lang | ..................... | B25B 31/005 29/238 |
| 2,601,802 A * | 7/1952 | Hanson | .................... | B60D 1/02 411/343 |
| 2,775,154 A * | 12/1956 | Leaphart, Sr. | ........... | B60D 1/02 411/341 |
| 3,335,631 A * | 8/1967 | Heeren | ..................... | B60D 1/02 411/345 |
| 4,125,048 A * | 11/1978 | Hardin | .................... | F16B 21/10 24/453 |
| 4,348,790 A * | 9/1982 | Kuramoto | ............... | E04G 7/305 24/601.5 |

(Continued)

*Primary Examiner* — Kevin Hurley
*Assistant Examiner* — Michael R Stabley
(74) *Attorney, Agent, or Firm* — Phillips Lytle LLP; David L. Principe

(57) ABSTRACT

A vertical hitch pin for connecting a tongue to the hitch on a vehicle. The hitch pin has an elongate opening for receiving a pivoting bar. The bar rotates clockwise from a center position where the bar fits substantially inside the hitch pin during insertion of the pin through aligned openings in the trailer tongue and the hitch to a first laterally extending position where the bar is rotated under the force of gravity until a portion of the bar engages with a first portion of a surface of the body bordering the elongate opening. The bar may also be capable of rotating counterclockwise from the center position to a second laterally extending position where the bar is rotated under the force of gravity until a portion of the bar engages with a second portion of the surface of the body bordering the elongate opening.

8 Claims, 5 Drawing Sheets

(56) References Cited

U.S. PATENT DOCUMENTS

| | | | | |
|---|---|---|---|---|
| 5,517,734 A * | 5/1996 | Korpi | ............ | B60D 1/02 24/453 |
| 6,193,261 B1 * | 2/2001 | Hahka | ............ | B60D 1/02 24/453 |
| 7,316,534 B2 * | 1/2008 | Hohmann | ............ | B60D 1/02 24/609 |
| 8,201,844 B1 * | 6/2012 | Smoot | ............ | B60D 1/025 280/491.5 |
| 8,267,420 B2 * | 9/2012 | Merten | ............ | B60D 1/02 280/514 |
| 2008/0164679 A1 * | 7/2008 | MacDougall | ............ | B60D 1/02 280/515 |

* cited by examiner

VERTICAL HITCH PIN

CROSS-REFERENCE TO RELATED APPLICATION

The present application claims priority benefit of U.S. Provisional Patent Application No. 62/203,465 entitled "Vertical Hitch Pin" filed on Aug. 11, 2015, which is hereby incorporated by reference.

DESCRIPTION OF THE PREFERRED EMBODIMENTS

Figure 1:
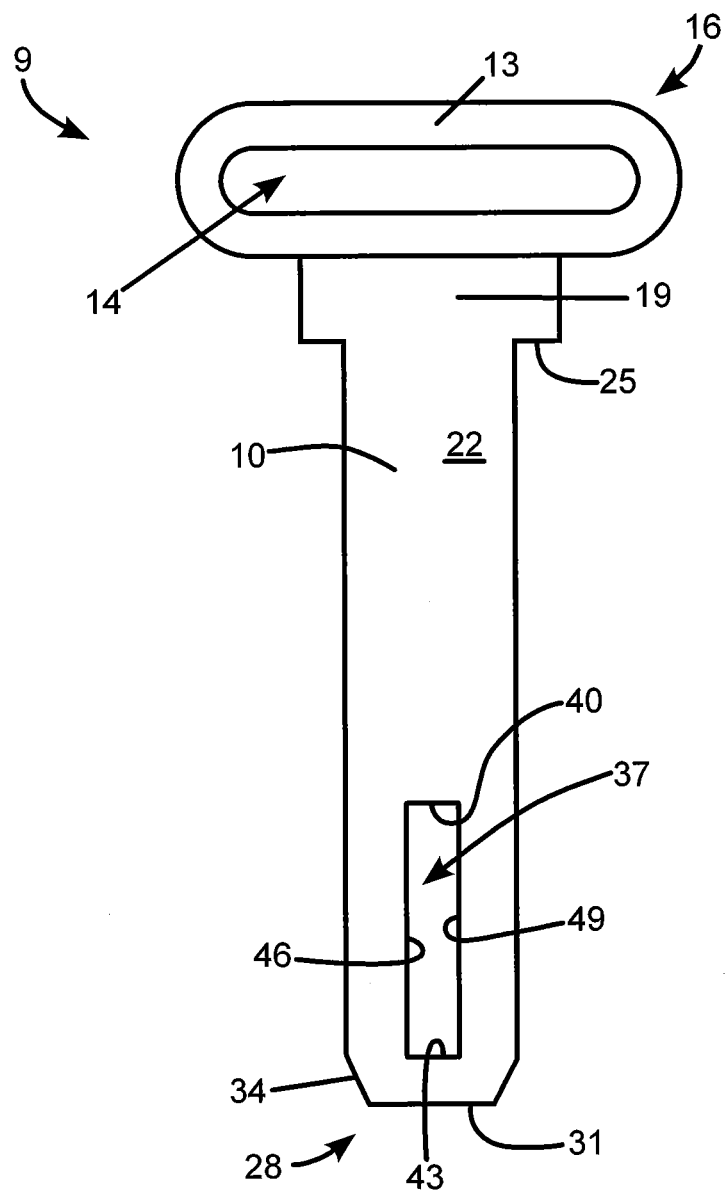
FIG. 1 is an elevational view showing the body of the vertical hitch pin of the present invention.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring now to the drawings, and more particularly to FIG. 1 thereof, this invention provides a vertical hitch pin 9 having a body 10 with a handle 13 at a first end 16. The handle 13 may be formed in the shape of an oval with an opening 14 for receiving the hand of a user. The body 10 may having an upper portion 19 disposed between a shaft 22 and the handle 13. The upper portion 19 may have a diameter greater than the diameter of the shaft 22. Accordingly, a shoulder 25 may be formed between the shaft 22 and the handle 13. The shaft 22 may be substantially cylindrical in its outer shape. The shaft 22 may extend to a distal portion 28 terminating at a distal end 31. The shaft 22 may be truncated near the end 31. A surface 34 may extend around the circumference of the shaft 22 and may angle inward. The inward angle of surface 34 may facilitate insertion of the hitch pin 9 through the openings in the parts that it is intended to connect.

The body 10 has an elongate opening 37 formed therein. The opening 37 extends all the way through the body 10 from one side to the other side. The opening 37 is bordered at the top and bottom by internal surfaces 40 and 43. The opening 37 is also bordered by internal surfaces 46 and 49 at the sides.

Figure 2:
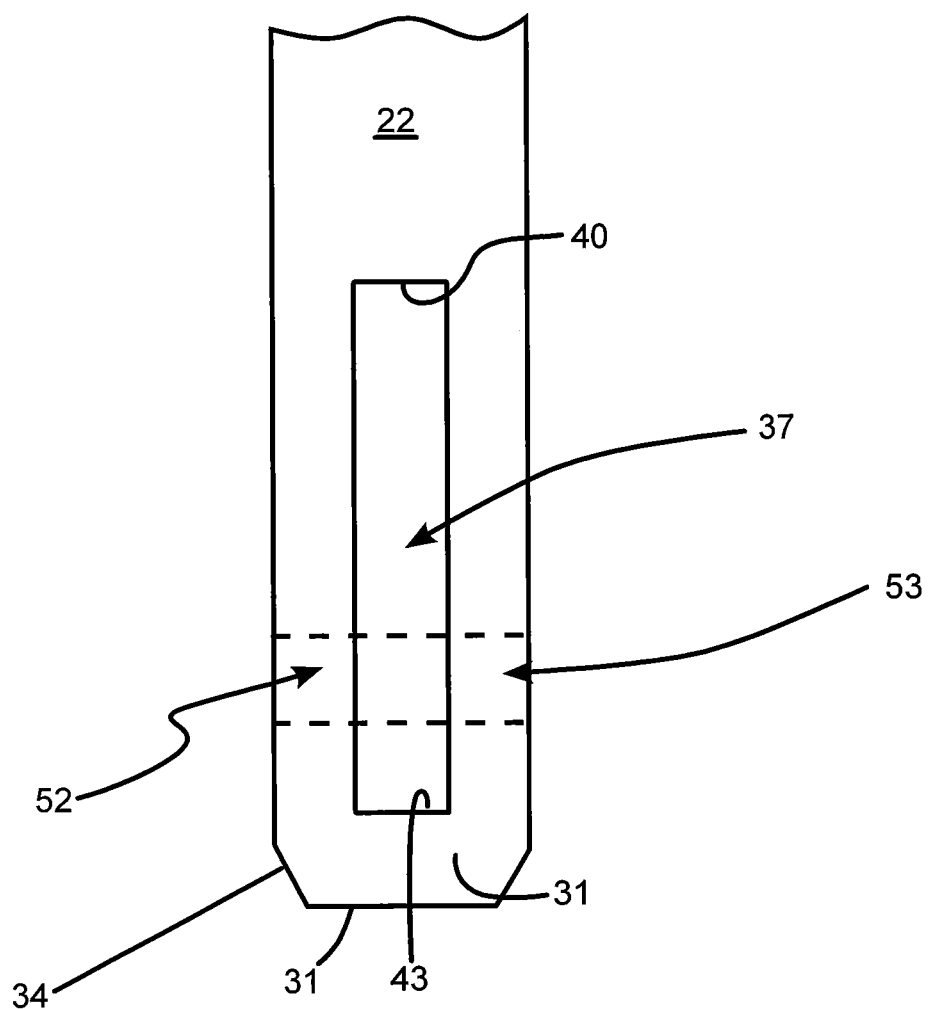
FIG. 2 is an enlarged view of a portion of the body of FIG. 1.

Turning to FIG. 2, a pair of transverse openings 52 and 53 are shown in broken lines. The transverse opening 52 (best shown in FIG. 4) extends through one side of the body 10, and intersects with opening 37.

Figure 3:
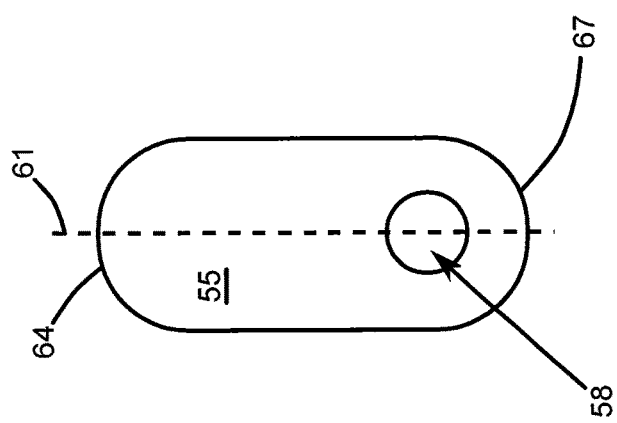
FIG. 3 is a plan view of a bar of the present invention.
Figure 6:
FIG. 6 is a perspective view of a pin.

In FIG. 3, a bar 55 has an opening 58 disposed therein. The opening 58 may be offset from the center of the bar 55 along a longitudinal axis 61. The bar 55 may be oblong with rounded ends 64 and 67 disposed opposite from each other. The opening 58 is sized to align with transverse openings 52 and 53 in the body 10 such that the bar 55 may be pivotally supported by a pin 70 (FIG. 6) disposed through the transverse openings 52 and 53 in body 10 and opening 58 in bar 55.

Figure 4:
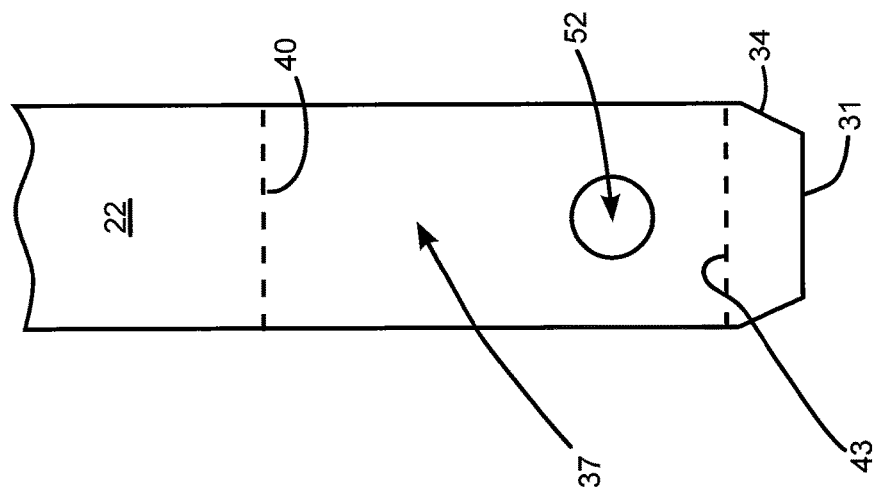
FIG. 4 is another elevational view of a portion of the body of FIG. 1.

In FIG. 4, the position of the transverse opening 52 relative to the elongate opening 37 in the body 10 is shown.

Figure 5:
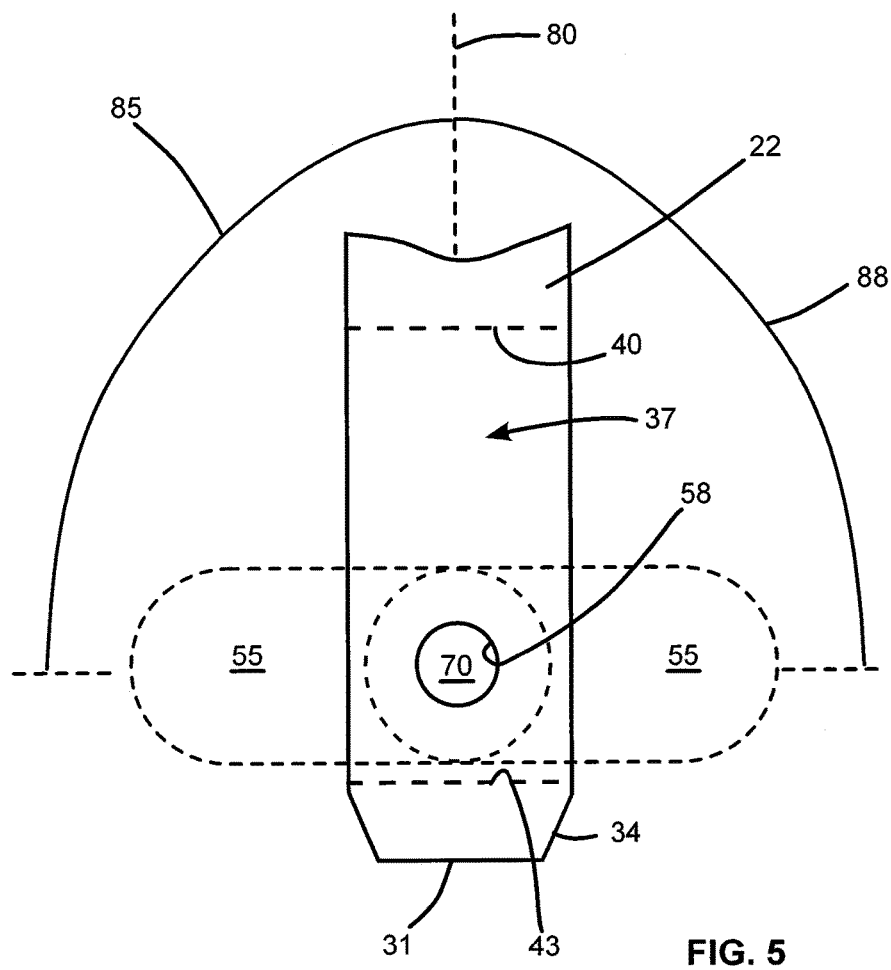
FIG. 5 is an elevational view of a portion of the body of FIG. 1 with a pair of positions of the bar shown in broken lines.

Turning to FIG. 5, the bar 55 may be pivotally attached inside elongated opening 37 by means of the pin 70 which may be inserted through the transverse openings 52 and 53 and the opening 58 in the bar 55. The pin 70 may be fixedly attached inside the openings 52 and 53 by means of welding, riveting, or the like. The bar 55 may freely rotate about the pin 70 inside opening 37. As shown, the bar 55 may rotate freely from top dead center (position where the major portion of the bar 55 extends upward and is centered along the longitudinal axis 80) to a left hand angle 85 which may be greater than ninety degrees but less than one hundred eighty degrees or to a right hand angle 88 which may be greater than ninety degrees but less than one hundred eighty degrees. The edges bordering the elongate opening and the edges of the bar may be chamfered. The chamfered edges eliminate an outside edge that could distort from an impact and interfere with the clearance of the bar when it passes through the opening.

In another embodiment, the elongate opening may extend through most but not all of the thickness of the body such that the elongate opening is bordered by a bottom wall and does not extend through the entire thickness of the body. In this embodiment, the bar may rotate in only one direction out of the body. However, having the elongate opening extend through the entire thickness of the body provides advantages when the hitch pin is used in areas where dirt, mud, debris or snow may be present. With an opening extending all the way through the thickness of the body, these materials may pass through the opening and are not susceptible to being trapped in the opening.

In use, the vertical hitch pin 9 attaches a tongue for a trailer, wagon, or other implement to a hitch on a vehicle. The bar 55 is oblong and is pivoted about a point offset from its center. Once the bar 55 rotates past top dead center, the force of gravity causes the bar 55 to rotate until a portion of the bar 55 rests against internal surface 43.

The purpose of the rotating bar 55 is to replace a cotter pin or bolt for preventing the hitch pin 9 from moving upward after the hitch pin 9 is installed thereby maintaining the connection between the tongue and the hitch. The vertical hitch pin 9 of the present invention provides several advantages. First, because the bar 55 is attached inside the body 10 of the vertical hitch pin 9 and remains attached during insertion and removal of the hitch pin 9, the device does not require a separate object such as a cotter pin that can become lost or damaged. Second, the design is simple and sturdy and capable of being operated by hand without the use of tools. When a bolt is substituted for a cotter pin, the bolt typically requires a nut for security. Removal of the nut requires a separate operation involving the use of a tool which may not always be convenient in the field.

Figure 7:
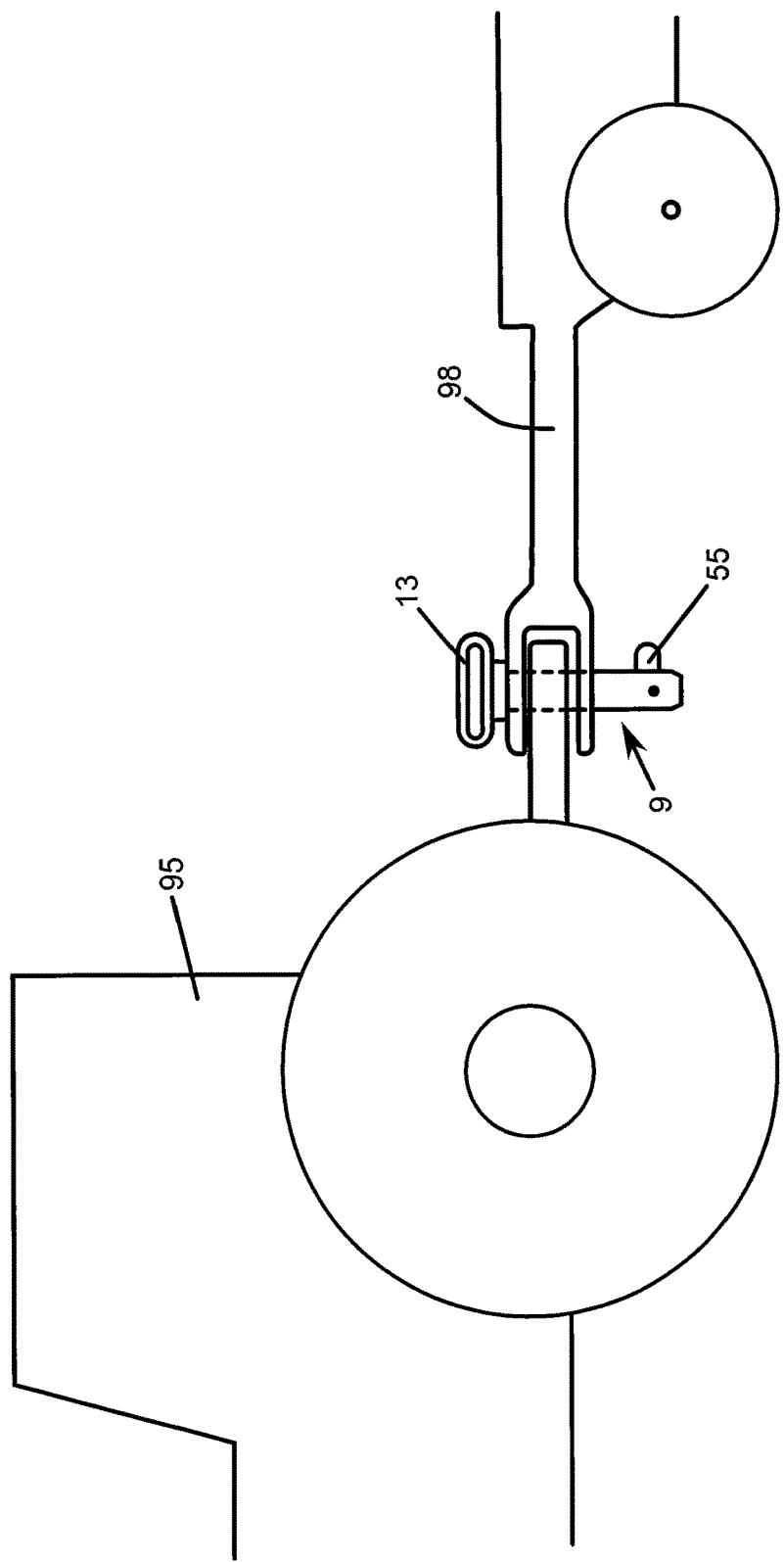
FIG. 7 is a diagram showing an application for the present invention.

As shown in FIG. 7, in use the hitch pin 9 may, for example, be used to connect a trailer 98 to a tractor 95. The bar 55 is held in position by gravity. In order to remove the hitch pin 9, the bar 55 is pushed upward until it fits inside the body 10 and an upward force is provided to the handle 13.

The present invention contemplates that many changes and modifications may be made. Therefore, while the presently-preferred form of the vertical hitch pin has been shown and described, and several modifications and alternatives discussed, persons skilled in this art will readily appreciate that various additional changes and modifications may be made without departing from the spirit of the invention, as defined and differentiated by the following claims.

The invention claimed is:

1. A hitch pin for connecting a tongue to a hitch on a vehicle, the hitch pin comprising: a body having a first end and a second end disposed opposite the first end, the body having an elongate opening defined therein, the elongate opening extending through the entire thickness of the body from a first side of the body to a second side of the body; a bar pivotally attached to the body inside the elongate opening, the bar being elongate and having a pivot point disposed in spaced apart relation to the center of the bar, the bar configured and arranged to freely rotate clockwise from a center position where the bar fits substantially inside the body during insertion of the pin, through aligned openings in the tongue and the hitch, to a first laterally extending position where the bar extends from the first side of the body and prevents the hitch pin from exiting from the tongue and hitch on the vehicle, the bar configured and arranged to freely rotate counterclockwise from the center position to a second laterally extending position where the bar extends from the second side of the body and prevents the hitch pin from exiting from the tongue and hitch on the vehicle; and, wherein during operation of the vehicle, with the tongue connected to the hitch, the bar is configured and arranged to rotate freely, where the bar is configured and arranged to rotate clockwise under the force of gravity until a portion of the bar engages with a first portion of a surface of the body bordering the elongate opening.

2. The hitch pin of claim 1, where the bar is configured and arranged to rotate counterclockwise under the force of gravity until a portion of the bar engages with a second portion of the surface of the body bordering the elongate opening.

3. A vertical hitch pin for connecting a tongue to a hitch on a vehicle, the hitch pin comprising: a body having a first end and a second end disposed opposite the first end, the body having an elongate opening defined therein, the elongate opening extending through the entire thickness of the body from a first side of the body to a second side of the body, the body having a pair of openings disposed transverse to the elongate opening and intersecting with the transverse opening; a pivot pin extending through the elongate opening and fixedly attached to the body portion at each end inside the pair of openings; a bar having an opening defined therein for receiving the pivot pin such that the bar rotates freely inside the elongate opening, the bar being elongate and being arranged to freely rotate about a pivot point disposed in spaced apart relation to the center of the bar, the bar capable of rotating clockwise from a center position where the bar fits substantially inside the body during insertion of the pin through aligned openings in the tongue and the hitch to a first laterally extending position where the bar is rotated under the force of gravity until a portion of the bar extends from the first side of the body and engages with a first portion of a surface of the body bordering the elongate opening, the bar capable of rotating counterclockwise from the center position to a second laterally extending position where the bar is rotated under the force of gravity until a portion of the bar extends from the second side of the body and engages with a second portion of the surface of the body bordering the elongate opening; and, wherein during operation of the vehicle, with the tongue connected to the hitch, the hitch pin bar is configured and arranged to rotate freely.

4. The hitch pin of claim 3, further comprising a handle at the first end of the pin.

5. The hitch pin of claim 4, wherein the second end of the hitch pin has a reduced diameter to facilitate insertion of the pin into the aligned openings on the tongue and hitch on the vehicle.

6. The hitch pin of claim 5, wherein the body has an upper portion with a larger diameter than the remainder of the body to form a shoulder.

7. The hitch pin of claim 3, wherein the bar is pivoted about an end of the bar closer to the second end of the body.

8. The hitch pin of claim 3, wherein the bar has a first end and a second end opposite the first end, the first and second ends being rounded.

* * * * *